(12) United States Patent
Sewell et al.

(10) Patent No.: US 9,900,667 B2
(45) Date of Patent: Feb. 20, 2018

(54) SYSTEMS AND METHODS FOR AUTHORIZED CONNECTION OF UTILITY SERVICE

(75) Inventors: Ronald R. Sewell, Alpharetta, GA (US); Jody Weigle, Alpharetta, GA (US); Steven Stewart, Alpharetta, GA (US)

(73) Assignee: ENERGYCOMNETWORK, INC., Alpharetta, GA (US)

( * ) Notice: Subject to any disclaimer, the term of this patent is extended or adjusted under 35 U.S.C. 154(b) by 584 days.

(21) Appl. No.: 13/517,792

(22) Filed: Jun. 14, 2012

(65) Prior Publication Data

US 2012/0326836 A1    Dec. 27, 2012

Related U.S. Application Data

(60) Provisional application No. 61/496,999, filed on Jun. 14, 2011.

(51) Int. Cl.
*G05B 19/02* (2006.01)
*H04Q 9/00* (2006.01)

(52) U.S. Cl.
CPC .......... *H04Q 9/00* (2013.01); *H04Q 2209/60* (2013.01)

(58) Field of Classification Search
CPC .......... H04Q 2209/60; H04Q 9/00; H02J 3/14
See application file for complete search history.

(56) References Cited

U.S. PATENT DOCUMENTS

| | | | | |
|---|---|---|---|---|
| 5,959,549 A | * | 9/1999 | Synesiou et al. | 340/870.02 |
| 2003/0063723 A1 | * | 4/2003 | Booth et al. | 379/106.03 |
| 2003/0080876 A1 | * | 5/2003 | Martin | 340/870.02 |
| 2004/0095237 A1 | * | 5/2004 | Chen | F24F 11/0086 340/506 |
| 2005/0240315 A1 | * | 10/2005 | Booth et al. | 700/295 |
| 2006/0044158 A1 | * | 3/2006 | Womble et al. | 340/870.02 |
| 2009/0307117 A1 | * | 12/2009 | Greiner | G06Q 20/145 705/34 |
| 2011/0115643 A1 | * | 5/2011 | Gilbert et al. | 340/870.09 |
| 2012/0053732 A1 | * | 3/2012 | Park | G08B 19/005 700/275 |

* cited by examiner

*Primary Examiner* — Quan-Zhen Wang
*Assistant Examiner* — Rajsheed Black-Childress
(74) *Attorney, Agent, or Firm* — Troutman Sanders LLP; James E. Schutz; Christopher C. Close, Jr.

(57) ABSTRACT

Systems and methods for authorizing the connection of a utility service are disclosed. The system can comprise a utility meter, or other utility connection, a utility server, and a means of communication. The utility meter can comprise a disconnect switch capable of connecting and disconnecting a location from the utility. The disconnect switch can connect the utility to the location upon a command from the server and confirmation from a customer. The system can enable utilities to offer pay-as-you-go and pre-paid utility services, which can minimize the financial exposure of the utility. The system can also enable customers to connect utility services without having to be present and/or come into physical contact with utility equipment.

19 Claims, 16 Drawing Sheets

SYSTEMS AND METHODS FOR AUTHORIZED CONNECTION OF UTILITY SERVICE

CROSS-REFERENCE TO RELATED APPLICATIONS AND PRIORITY CLAIM

This Application claims priority under 35 U.S.C. § 119(e) to, and the benefit of, U.S. Provisional Patent Application No. 61/496,999 of the same title, filed 14 Jun. 2011. The entirety of the above-mentioned Application is hereby incorporate by reference as if set forth in its entirety below.

TECHNICAL FIELD

Embodiments of the present invention relate to utility payment and connection systems and, more particularly, to the safe, remote connection of utility services.

BACKGROUND

Utility companies must connect their services to customers for a variety of reasons. Obviously, utilities must be connected to new customers. In addition, service is sometimes interrupted when, for example and not limitation, customers fail to pay, go out of town for extended periods, or perform maintenance (e.g., an electrician needs to disconnect service to replace the main circuit breaker panel). In addition, many utilities now offer services on a pay-as-you-go, or pre-paid, basis. This enables utilities to minimize their financial exposure and enables customer to carefully manage their utility spending and use.

Pre-pay enables customers to subscribe to utility services without having to pay a deposit, for example, and without utility service providers risking non-payment. Pre-pay also enables a customer to control the timing and amount of a utility payment, which can be particularly useful with non-essential services (e.g., cable television). In addition, because the utility service is provided after payment, the customer is provided with improved management over utility spending. In other words, when the customer has used the pre-paid amount, and no new funds have been added to the account, the service can be disconnected. This can prevent additional unplanned spending for the customer and can reduce or eliminate exposure for the utility.

Remote disconnection of service poses some risks, however. If electrical service is disconnected, for example, perishable items such as food and medicines, for example, which require refrigeration may spoil. In addition, loss of electrical power can cause a loss in air conditioning and/or heat, which can be deadly in extreme climates.

Although some risks exist when disconnecting service, these risks are generally more gradual in nature. Even in summer, for example, it takes several hours for a house to heat up and it may take days for a refrigerator or freezer to reach unsafe food safety temperatures. Utilities risk far greater exposure to liability, however, when remotely reconnecting services. Appliances that were in use when the power was disconnected, for example, may not have been unplugged or turned off after the power was disconnected. In addition, when the service interruption spans several hours or several days, a variety of dangerous situations may arise including, but not limited to, fire hazards, electrical shocks, and component damage. Flammable items in proximity to irons, ovens, and stoves, for example, pose a risk of fire when power is returned to these appliances. In addition, sensitive electronics may be damaged or destroyed from disconnection, reconnection, or a combination thereof.

As a result, conventional systems have attempted to mitigate this liability by requiring some physical interaction by the resident prior to restoring power. In this manner, the resident's physical actions are the final step, or authorization, in the reconnection process. In these systems, the resident must first deposit new funds into the account and then must physically depress a button on the utility meter to complete the reconnection process. This type of system ensures that the customer is home, but does little to ensure that the customer has verified that conditions are safe for the reconnect. As a result, conventional systems inconvenience customers, while providing only a false sense of security.

FIG. 1 depicts a conventional arming system 100 in a conventional electrical utility service network. The utility meter 20 located at the customer's location 25 (e.g., residence or business) is equipped with a hardware switch 30 (e.g., a button or lever connected to an electrical switch), to enable the customer 5 to authorize the reconnection of service to the location 25. The utility can employ a server 10, or bank of servers, to maintain customer records and account statuses. In some cases, the server 10 can be connected to the meter 20 directly, or may be connected wirelessly. The connection can also comprise a base station 15, or relay, to relay signals between the meter 20 and server 10.

When the customer is ready for service to be reconnected, the customer first makes a payment to the utility 110 via, for example and not limitation, an internet or phone connection to the utility's servers. The server can then send an "arm" command 120 to the meter. In some cases, the signal can be transmitted across a network and ultimately to the meter located at the customer's location. Upon receiving the arm command 120, the utility meter is placed in an "armed" state 130. To complete the connection, the customer must physically access the utility meter and press the "arm" button 140, or switch, to authorize reconnection. Only after the arm button has been depressed 140 can service be reconnected to the location.

While this conventional solution reduces some liability from foreseeable dangers such as fire hazard because at least the customer is present, this solution is not a total one and presents different, potential larger risks. In some cases, for example, the utility meter can be in a location that, in and of itself, poses a danger to the customer. In other cases, such as in an apartment complex, access to the utility meter may simply not available to the resident (e.g., it may be in a locked utility cabinet).

What is needed, therefore, is a system and method that enables utility and other services to be reconnected to a location without requiring the customer to physically interact with the meter or other utility component. It should provide a means for customer interaction and/or confirmation of reconnection without requiring physical interaction between the customer and utility equipment. If desired, the customer should be able to provide such interaction without being present at the location.

SUMMARY

Embodiments of the present invention relate generally to a remote system and method that enables utilities and other services to be remotely connected and disconnected. In a preferred embodiment, the customer is not required to physically interact with utility company equipment to affect reconnection. The system can comprise a utility meter connected remotely to a utility server. The meter can connect and disconnect the utility service based on commands from the server. The server can require a customer acknowledgement prior to reconnection to ensure a location is safe for reconnection and to shift liability for same to the customer.

Embodiments of the present invention can comprise a device for remotely connecting a utility service meter. In some embodiments, the device can comprise a controller in communication with a remote utility server, a disconnect switch in series connection with a utility service for connecting and disconnecting a utility from a location. In some embodiments, the controller can activate the disconnect switch in response to a first signal from the remote utility server to disconnect the utility from the location and deactivate the disconnect switch in response to a second signal from the remote utility server to connect the utility to the location.

In some embodiments, the disconnect switch can be electromechanical. In some embodiments, such as for use with an electrical utility, the disconnect switch can be, for example and not limitation, a latching switch, solenoid switch, relay, motorized relay, or other type of "on/off" switch. In other embodiments, such as for use with a gas or water utility, the disconnect switch can be a mechanical valve, such as a solenoid or ball valve, to stop the flow of a gas or liquid.

In some embodiments, the device can further comprise a communications module for connecting the controller to the remote utility server. The communications module can comprise, for example and not limitation, a cellular or radiofrequency ("RF") transceiver.

Embodiments of the present invention can also comprise a system for remotely connecting a utility service. In some embodiments, the system can comprise a utility server for maintaining and storing a customer account database and a customer utility connection. In some embodiments, the customer utility connection, or utility box, can comprise a communications module for communicating with the utility server, a disconnect switch in series connection with a utility service for connecting and disconnecting a utility from a location, and a controller for processing signals from the utility server and controlling the disconnect switch. In a preferred embodiment, the controller activates the disconnect switch in response to a first signal sent from the remote utility server to disconnect the utility from the location and deactivates the disconnect switch in response to a second signal sent from the remote utility server to connect the utility to the location.

In some embodiments, the communications module can comprise an RF or cellular transceiver. In a preferred embodiment, the utility server must receive an acknowledgement signal from a user to send the second signal.

Embodiments of the present invention can also comprise a method for connecting a utility service remotely comprising receiving a request, at a server, from a customer for connection to a utility service, updating a customer account status record in a database on the server, sending a message to the customer, from the server, requesting an authorization transmission, receiving at the server the authorization transmission from the customer, and sending a command from the server to a utility meter to connect service.

In some embodiments, the authorization transmission can comprises an acknowledgement of terms and conditions from the customer. The authorization transmission can comprise, for example and not limitation, a text message, a response on a website, a response on a smart phone app, a direct interaction with a customer service representative, or a response to an interactive voice response system. In some embodiments, the method can further comprise receiving an agreement to the terms of service from the customer.

These and other objects, features and advantages of the present invention will become more apparent upon reading the following specification in conjunction with the accompanying drawing figures.

DETAILED DESCRIPTION

Figure 1:
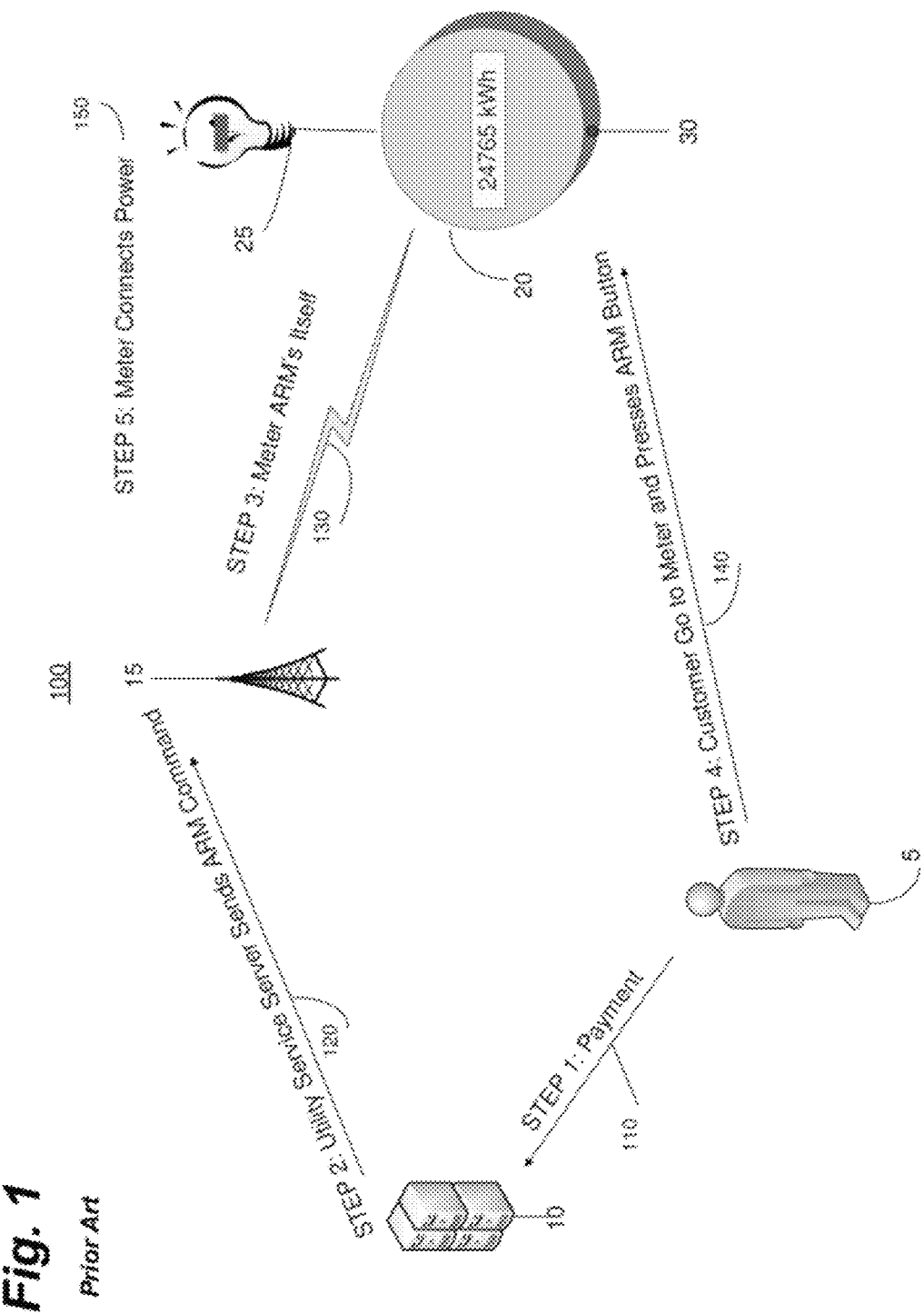
FIG. 1 illustrates a diagram of a conventional utility metering system.

Embodiments of the present invention relate generally to a system and method for providing access to utilities and other services, and specifically to a system for connecting and disconnecting these services remotely. Embodiments of the present invention can provide improved customer service, while reducing liability to utility providers and increasing flexibility. Embodiments of the present invention can enable customers to utilize, for example and not limitation, pay-as-you-go utilities with increased safety and convenience.

To simplify and clarify explanation, the system is described below as a system for connecting and disconnecting electrical service to a customer's location. One skilled in the art will recognize, however, that the invention is not so limited. The system is equally applicable to, for example and not limitation, phone, gas, cable, and satellite utilities. The systems are described below with certain components (e.g., electrical switches), but can be used with other types of utilities (e.g., electrical switches can be replaced with water valves) without departing from the spirit of the invention. In addition, the system is described below in relation to a utility meter. One skilled in the art will recognize, however, that the system is equally applicable to, for example and not limitation, cable TV, satellite, phone, and internet connections, that may, or may not, use an actual utility meter.

The materials described hereinafter as making up the various elements of the present invention are intended to be illustrative and not restrictive. Many suitable materials that would perform the same or a similar function as the materials described herein are intended to be embraced within the scope of the invention. Such other materials not described herein can include, but are not limited to, materials that are developed after the time of the development of the invention, for example. Any dimensions listed in the various drawings are for illustrative purposes only and are not intended to be limiting. Other dimensions and proportions are contemplated and intended to be included within the scope of the invention.

As mentioned above, a problem with current utility systems is that, for the service to be reconnected, the customer generally has to be present. As described, this may require the customer to, for example, press a reset, or arming, button on the utility meter. This presents risk of injury to the customer and liability to the utility. In some instances, the utility meter may be located in a dangerous location or may simply be outdoors during inclement weather. In other instances, the meter may be inaccessible to the customer, e.g., in a large utility closet in an apartment complex. In addition, it may simply be inconvenient to require the customer to be present to reconnect the service. It is often difficult, for example, to coordinate customer schedules with service personnel availability.

What is needed, therefore, is a system and method that enables utilities to be remotely disconnected and reconnected that does not require direct, physical customer interaction with utility equipment. The system should, in some instances, enable remote connection without requiring the customer to be present at the service location. It is to such a system and method that embodiments of the present invention are primarily directed.

Figure 2:
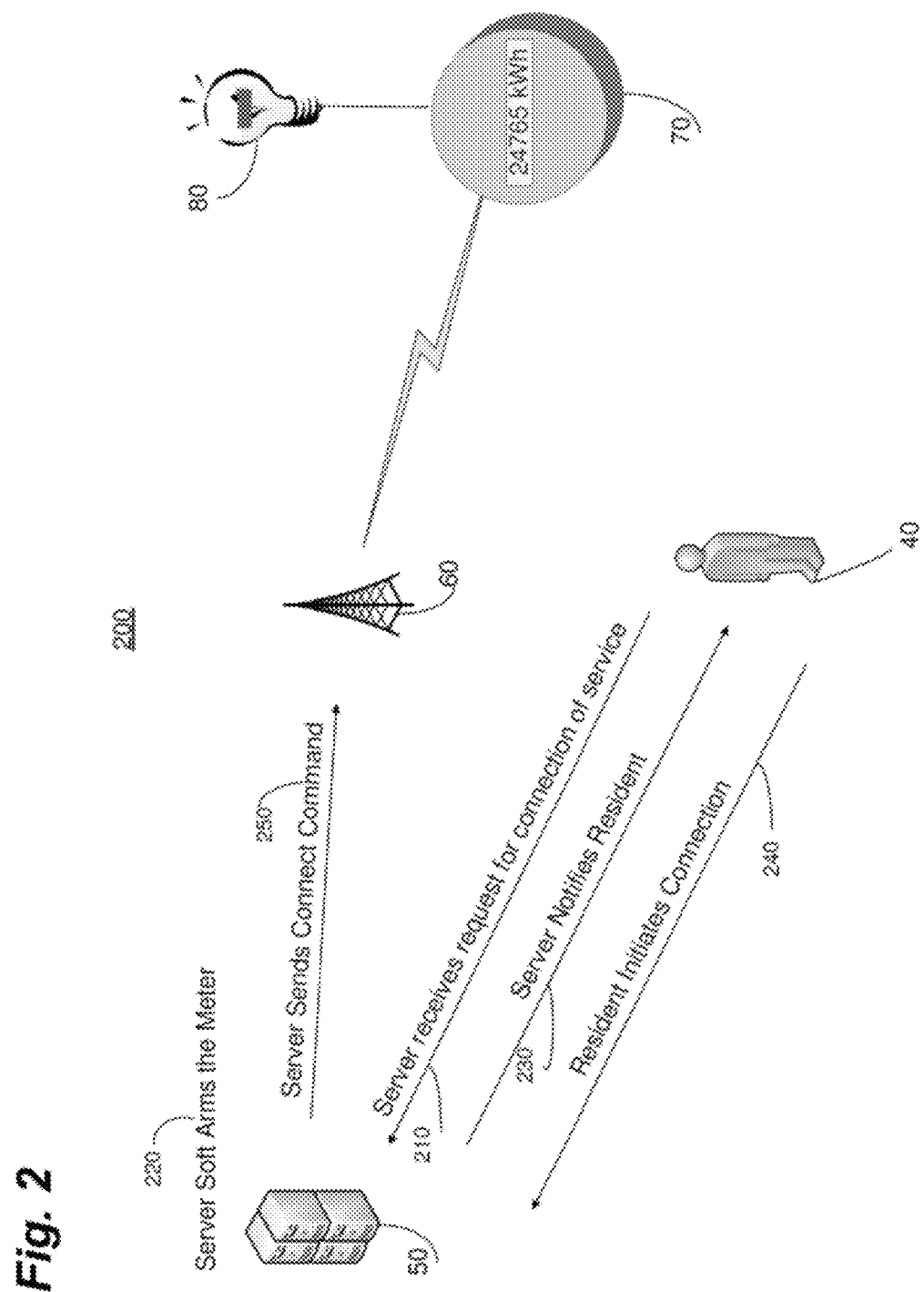
FIG. 2 illustrates a system for authorizing the automated connection of utility services, in accordance with some embodiments of the present invention.

As shown in FIG. 2, embodiments of the present invention can comprise a soft arming metering system 200 for connecting a utility to a customer location. In some embodiments, a customer 40 can be in communication with a utility via a server 50 via an internet, phone, or other appropriate connection. In other embodiments, the customer 40 can be in communication with the utility directly through a customer service representative ("CSR"). The utility server 50 can be, for example, a standalone server configured to manage the accounts of utility customers or can comprise an overall utility computer system. In addition, the utility server 50 can be implemented as a single server or as a server farm. In some embodiments, the server 50 can utilize a storage system, and a database, to store customer records and related account information.

The customer 40 can be any customer of a utility service, including, but not limited to, cable TV, satellite TV, internet, power, water, or natural gas. The customer 40 can be, for example and not limitation, a residential customer, commercial customer, or pay-as-you-go or pre-paid customer. The records maintained by the server 50 can include, for example, a record of the customer's personal and account information, including the customer's account status, among other things. The customer's account statuses can include, for example, and not limitation, connected, disconnected, armed, soft-armed, and pending. The communication between the customer 40 and the server 50 can be accomplished in any suitable manner including, but not limited to, an internet or mobile phone connection, text messaging, instant messaging, an automated phone system, an Interactive Voice Response (IVR), or a direct interaction between the customer 40 and a CSR.

In some embodiments, the server 50 can be directly connected to the customer's utility connection 70 (e.g., a utility meter or switch) via an appropriate data link (e.g., an internet of phone connection). In other embodiments, the server 50 can be in communication with a base station 60, or other communications relay, to enable the server 50 to communicate with the utility meter 70. The communication can occur, for example, via the internet, a cell phone, a land line, or by radio or other wireless means. In a preferred embodiment, the server 50 and meter 70 can be connected via an advanced metering infrastructure ("AMI") system. AMI is a term used to represent the networking technology of fixed network meter systems that include remote utility management. The meters in an AMI system are often referred to as smart meters, since they can often collect and use data based on programmed logic[1].

[1]"Automatic Meter Reading," Wikipedia.com, available at http://en.wikipedia.org/wiki/Automatic_meter_reading.

In some embodiments, the base station 60 can communicate over a wireless link (e.g., radiofrequency ("RF") communications) with the utility meter 70 located at, or near, the customer's location 80 (e.g., a business or residential building). In some embodiments, the utility meter 70 can be equipped with, for example and not limitation, a cellular or RF transceiver to receive and transmit to the base station 60 wirelessly. In other embodiments, the utility meter 70 can comprise a direct (e.g., LAN or telephone land line) or indirect (e.g., internet) wired connection The utility meter 70 can record, for example and not limitation, the amount of a service utilized at the location 80, peak use times, and use trends. A utility meter 70 for an electrical power utility, for example, can measure the amount of electricity delivered (e.g., in kilowatt hours) to a customer location 80, among other things.

In some embodiments, the utility meter 70 can also comprise a remote connect/disconnect means. The meter 70 can use, for example and not limitation, a latching switch, solenoid switch, relay switch, motorized relay, or other type of "on/off" switch connection device located inside, or external to, the meter 70 to disconnect and reconnect the customer's power.

Figure 3:
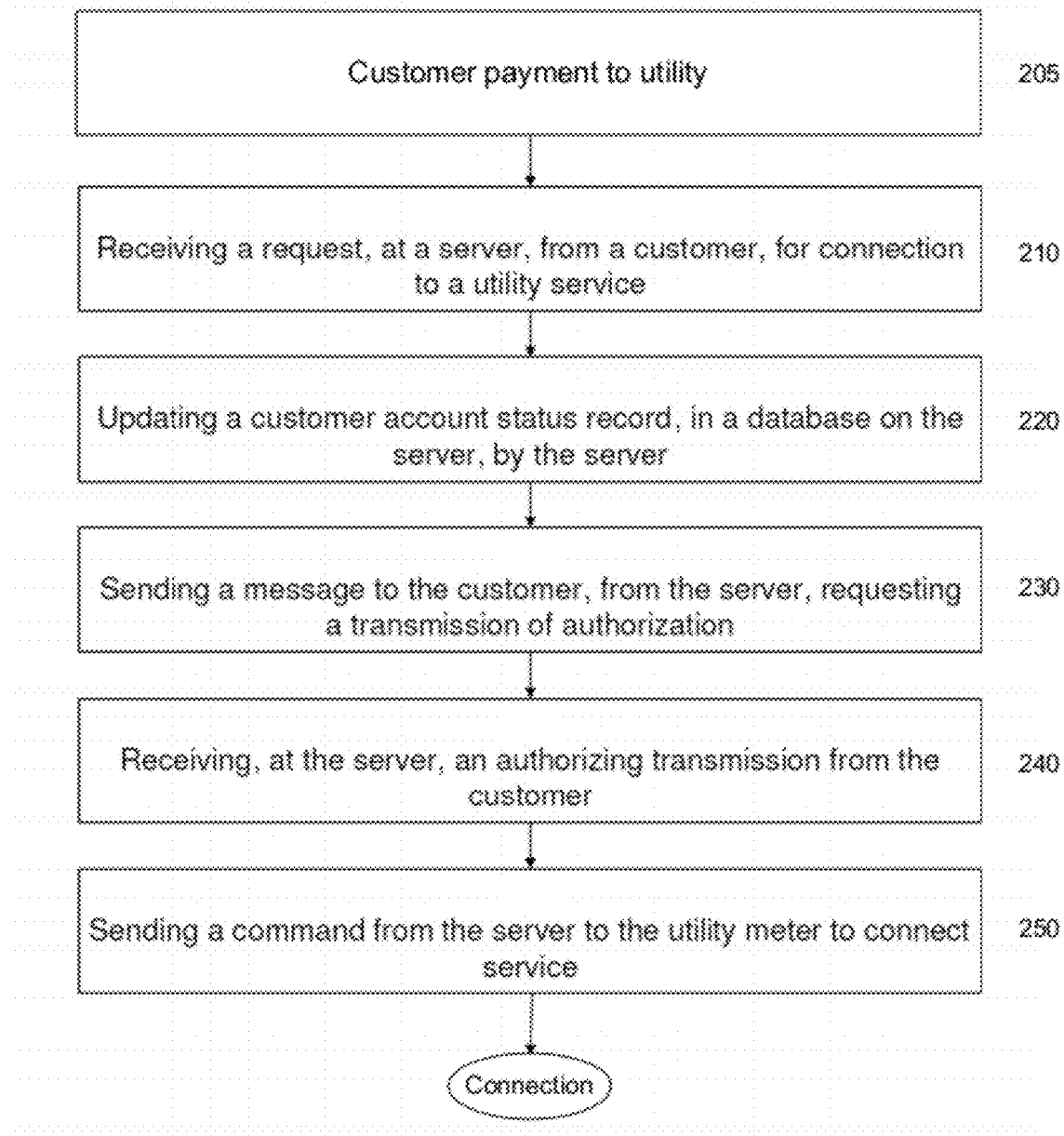
FIG. 3 illustrates a method for authorizing the automated connection of utility service, in accordance with some embodiments of the present invention.

As shown in FIGS. 2 and 3, starting with the service in a disconnected state, e.g., for a new customer or a pre-pay customer, the customer can first make a payment 205. For a new customer, for example, this may include a deposit and one or more months of service. For a pre-pay customer, on the other hand, the customer can pre-pay for the amount of service desired, though a minimum payment may be required. The customer can access and pay their account using any suitable method. Payment can be accomplished by logging into the customer's account via an internet or phone connection, for example, and executing a payment transaction using a credit or debit card or other electronic payment means. Of course, the customer may also be able to pay in person at a customer service location.

After payment 205, the customer can request (re)connection 210. In some embodiments, the request for the connection 210 can be initiated automatically upon receipt of payment by the server. In other embodiments, the request for the connection 210 can be triggered, for example and not limitation, when the customer is initiating service for the first time, after service has been interrupted (e.g., as the result of a weather emergency or non-payment), or any other time the customer desires to connect or reconnect service.

After receiving a request to connect 210, the server can "soft arm" the meter 220 in preparation for connection. The server can soft arm the meter 220 by updating the customer's account status to soft-armed in the system. In some embodiments, the status of soft-armed can indicate that connection of the customer's service has been requested by the customer. In a preferred embodiment, the server does not have to communicate any message to the meter to indicate that the meter has gone into "soft-armed" state. In other words, the soft-armed state can exist purely within the server (e.g., in the customer's account status) and can indicate to the server 50 that a customer authorization sequence should be initiated.

In some embodiments, the server can execute a customer authorization sequence by notifying the customer 230 that the customer's account has been soft-armed. This can be achieved by sending the customer a message 230 requesting that the customer take an authorization action. The server can notify the customer 230 via, for example and not limitation, a text message, an email message, an automated voice message, or by instructing a CSR to place a phone call to the customer.

The customer can then initiate connection to service 240 by sending an authorization transmission by any suitable method to the server. Authorization transmissions can include, for example and not limitation, the customer sending a text message, clicking a link or button contained in a text message or on a website, responding to an email, clicking on a link or button contained in an email, logging into a web portal that accesses the server, calling an IVR system, or calling a CSR to verbally authorize reconnection.

The authorization transmission can serve several purposes depending on what type of service is being connected. In some embodiments, for example, the authorization request may require the customer to read and accept terms of use, a disclaimer, or other legal documentation. In other embodiments, the authorization request may require the customer to confirm that conditions are safe at their location for connection. In still other cases, the authorization request may require that the customer confirm that they are present at the location prior to connection. These safety messages and disclaimers can be useful not only in confirming that conditions are safe to proceed, but also in shifting responsibility from the utility to the customer.

In still other embodiments, the authorization request can simply be a final confirmation from the customer that they have requested connection. This can be useful, for example, to prevent unauthorized users from connected the service. This can also be useful for utilities such as, for example and not limitation, cable television that pose little danger to people or property at reconnection. In this manner, the service can be connected, but the customer need not be present at the location. This is respectful of the customer's time and also avoids the problem of missed appointments for the utility.

Upon receiving the authorization transmission, in whatever form, the server can send a connect command to the utility meter 250. The connect command can cause the utility meter to connect the service to the customer location. This can be done using an automated switch or relay, for example, located on the meter. In this manner, no physical interaction with the meter is required for the meter to be reconnected 250.

In some embodiments, a conventional meter may still have a physical button located on the exterior of the meter, which the customer could press to engage the armed switching device. In a preferred embodiment, the server connect command 250 can override the button on the meter and eliminate the need for the customer to physically press the arming button. This can be accomplished by allowing the customer to affirmatively respond to a prompt from a test message, IVR, smart phone application, an iconic button on an application, a web prompt, or other communication device, as described above.

Figure 4:
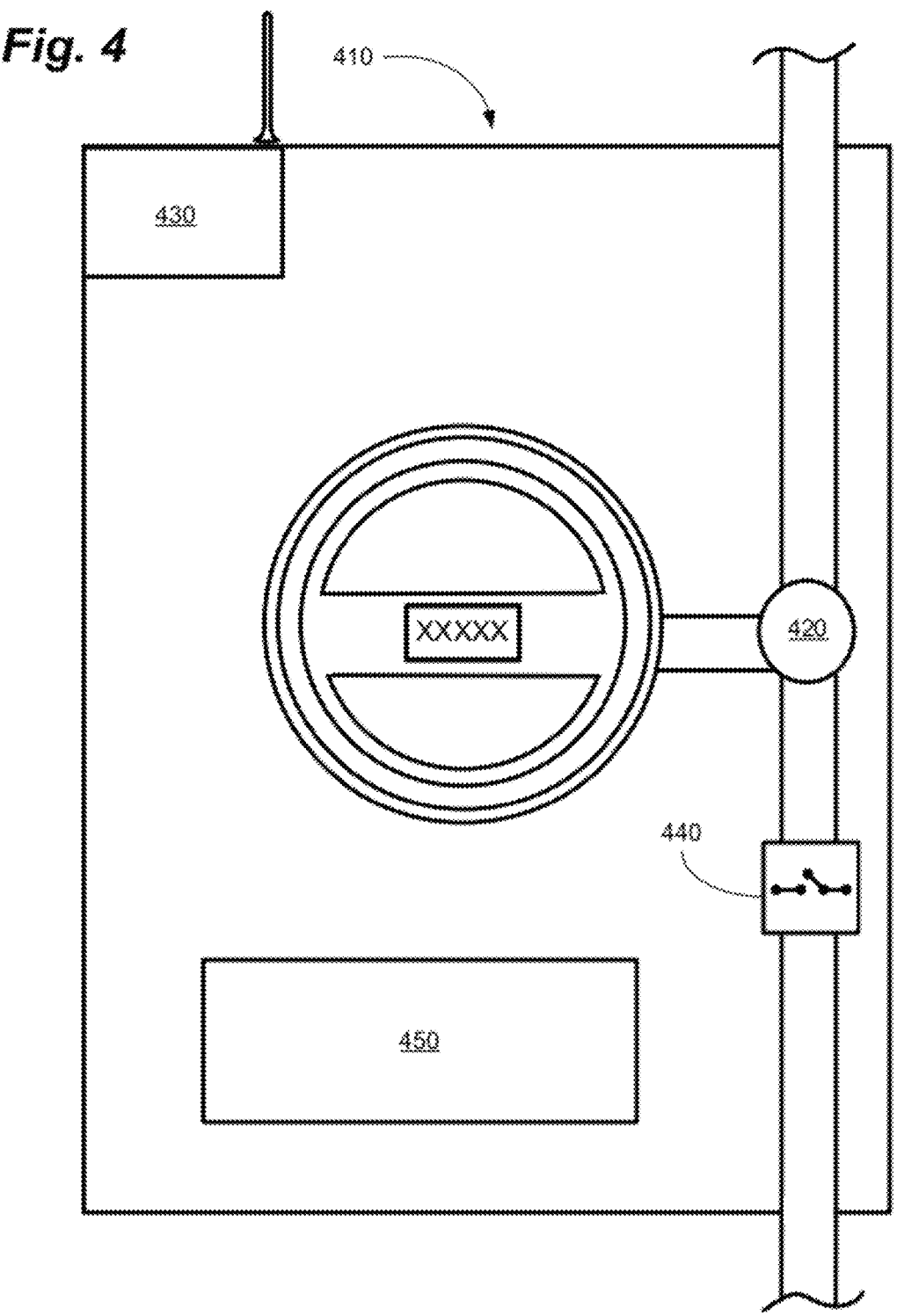
FIG. 4 illustrates a utility meter with remote connect/disconnect capabilities, in accordance with some embodiments of the present invention.

As shown in FIG. 4, the utility meter 410 can comprise a standard utility meter for, for example and not limitation, cable TV, internet, water, gas, or electricity. The utility meter 410 can comprise a mechanical or electronic flow valve 420, for example, to measure the quantity of a particular resource that is consumed. The meter 410 can also comprise a communication module 430. The communication module 430 can provide a connection to a base station or directly to the utility via, for example and not limitation, an internet, cellular, landline, or RF connection. In some embodiments, the method of connection can be determined by an existing connection at the meter. In other embodiments, the communications module 430 can have a standalone connection and can provide connectivity to formerly unconnected meters.

The meter 410 can further comprise a remote connect/disconnect switch 440. In some embodiments, the switch 440 can comprise a transistorized switch or electrical relay, for example, for the control of electrical, cable TV, satellite, or internet connections. In other embodiments, the switch 440 can comprise a motorized valve or solenoid, for example, to interrupt the flow of water or gas.

The meter 410 can further comprise a control module 450. The control module can comprise, for example and not limitation, one or more microprocessors, one or more sensors, and one or more interconnects to connect to the various components 420, 430, 440, 450 in the meter 410. In some embodiments, the control module 450 can further comprise logic to monitor and/or control use. In some embodiments, the control module 450 can include the ability to interrupt service as requested by the server. In other embodiments, the control module 450 can also include the ability to interrupt service in response to, for example, excessive current draw, fluid flow, or other indication that a malfunction or emergency exists. The control module 450 can also include data gathering and throttling capabilities to monitor and/or limit service in peak times, for example.

Figure 5:
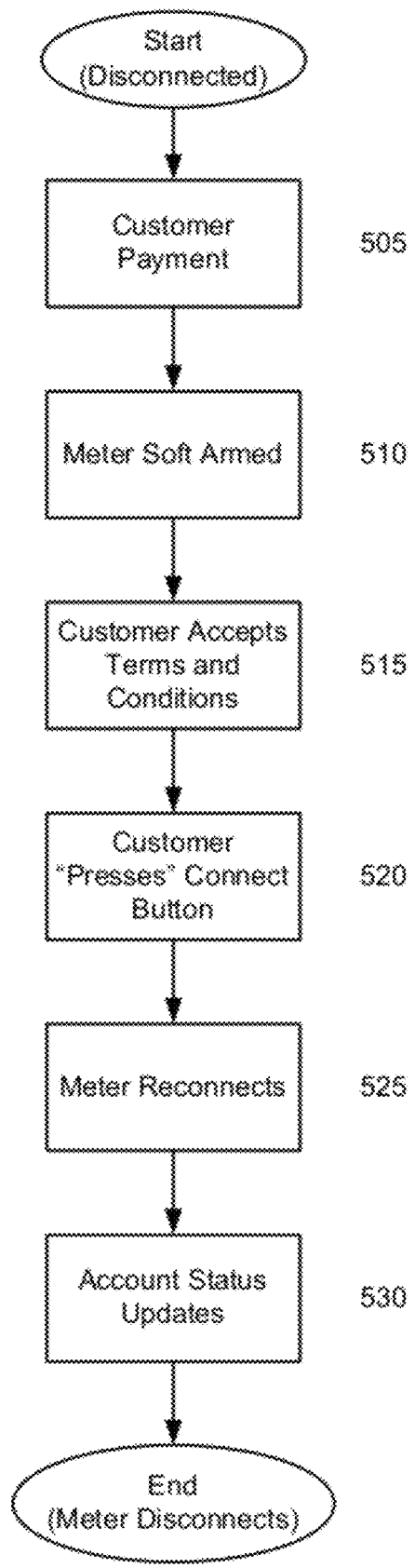
FIG. 5 is a flowchart depicting a method of reconnecting a utility with customer authorization, in accordance with some embodiments of the present invention.

As shown in FIG. 5, embodiments of the present invention can also comprise a method and system 500 for remotely reconnecting a utility to a location. At the outset, the utility can be disconnected from the user's location. The utility may be disconnected because, for example and not limitation, the customer is a new customer and had never been connected, the customer has been out of town for an extended period, or the customer failed to pay their bill in a timely manner. In some embodiments, therefore, the first step can be payment of any outstanding bills and/or prepayment by the customer 505. Of course, if service was voluntarily disconnected (e.g., the customer was simply out of town), this step may not be necessary.

The system 500 can then soft arm 510 the meter. Soft arming the meter 510 updates the status of the meter to indicate that the meter is ready to be reconnected, but does not actually connect it to the utility, pending confirmation from the user. Upon soft arming the meter 510, the system 500 can then prompt the user to accept the terms and conditions 515 of reconnection. The terms and conditions can include, for example and not limitation, acceptance of various legal terms, confirmation that it is safe to connect power at the location (e.g., there is nothing flammable on the stove), and confirmation that the customer is home. This enables the utility to shift liability to the user and also enables the user to, for example, travel to the location or check for issues prior to connection.

Once the user has accepted the terms and conditions and is ready to reconnect power, the user can "press" the connect button 520. The connect button can be, for example and not limitation, a button on the screen of a computer that is pressed with a mouse, or a button on a touch screen, or an actual button on a keyboard (e.g., "press 'C' to connect). In a preferred embodiment, the connect button is not available until the customer accepts the terms and conditions. This ensures that the customer acknowledges responsibility for the reconnection.

After pressing the connect button, in whatever form, the system 500 can update the status from soft armed to connected. In some embodiments, a signal can be sent to the meter or a component therein to reconnect service. This can be done remotely using, for example and not limitation, a relay or other electromechanical or electronic means. In some embodiments, the system 500 can then update the user's account status to "connected."

Embodiments of the present invention can also comprise software 600 for remotely connecting a utility to a location. The software 600 can be, for example and not limitation, implemented on a personal computer, an "app" on a smart phone or tablet, or can be web-based. The software 600 can enable the user to check their account status, connection status, and account balance, among other things.

Figure 6:
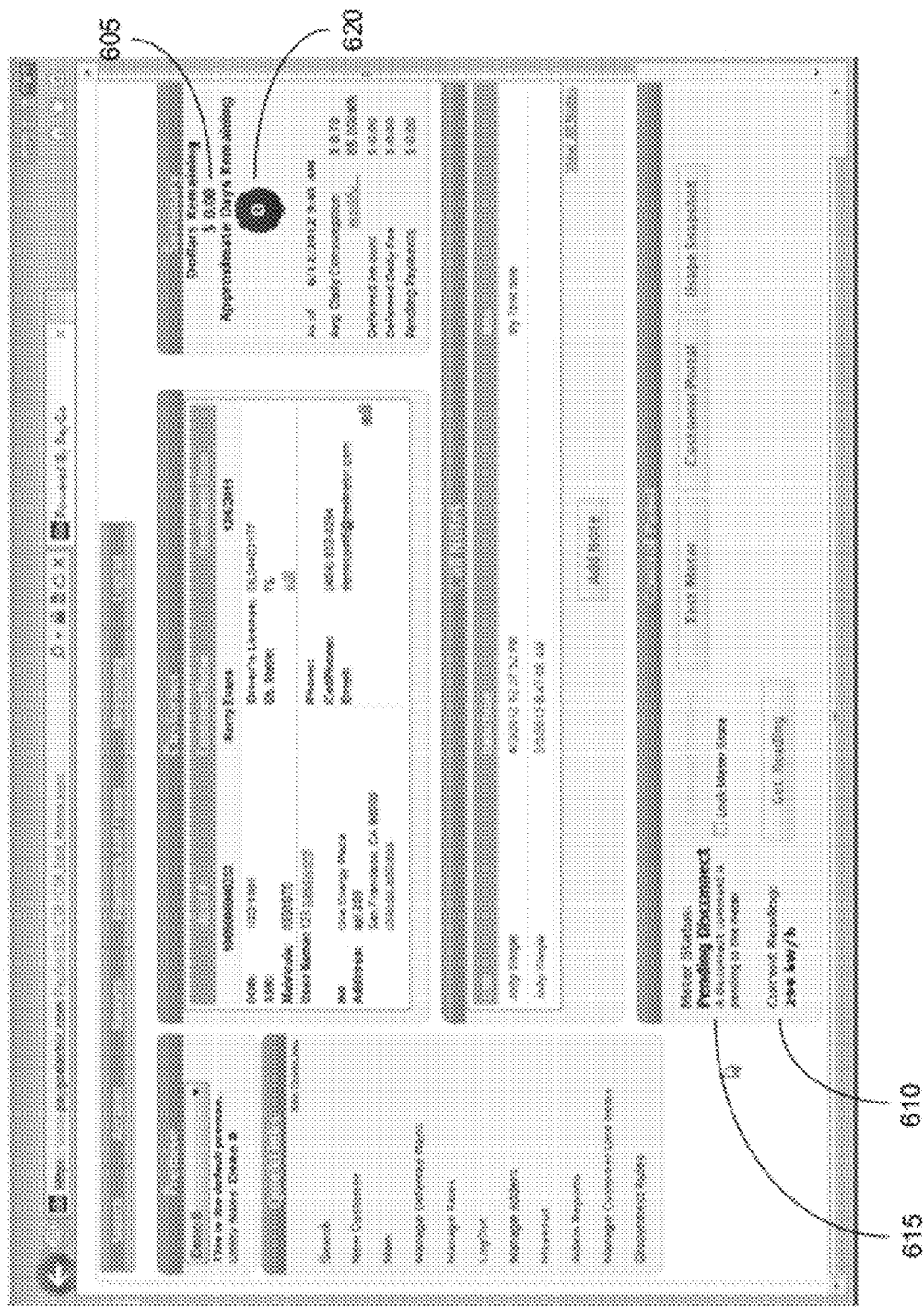
FIGS. 6-16 are screen captures of a system for reconnecting a utility with customer authorization, in accordance with some embodiments of the present invention.

As shown in FIG. 6, in some embodiments, the software 600 can enable the user with a graphical user interface ("GUI") to provide the customer with various account information. For all customers, for example, it can be useful to provide account balance 605, current meter reading 610, and current connection status 615. For pre-paid customers, it may also be useful to provide the approximate number of days of service remaining 620, based on, for example, historical or average use. As shown in FIG. 6, the customer has a zero balance 605 and thus, zero days of connection remaining 620. In addition, the meter is in the process of disconnecting 615 (i.e., a command has been sent to the meter, but has not been acknowledged yet.

Figure 7:
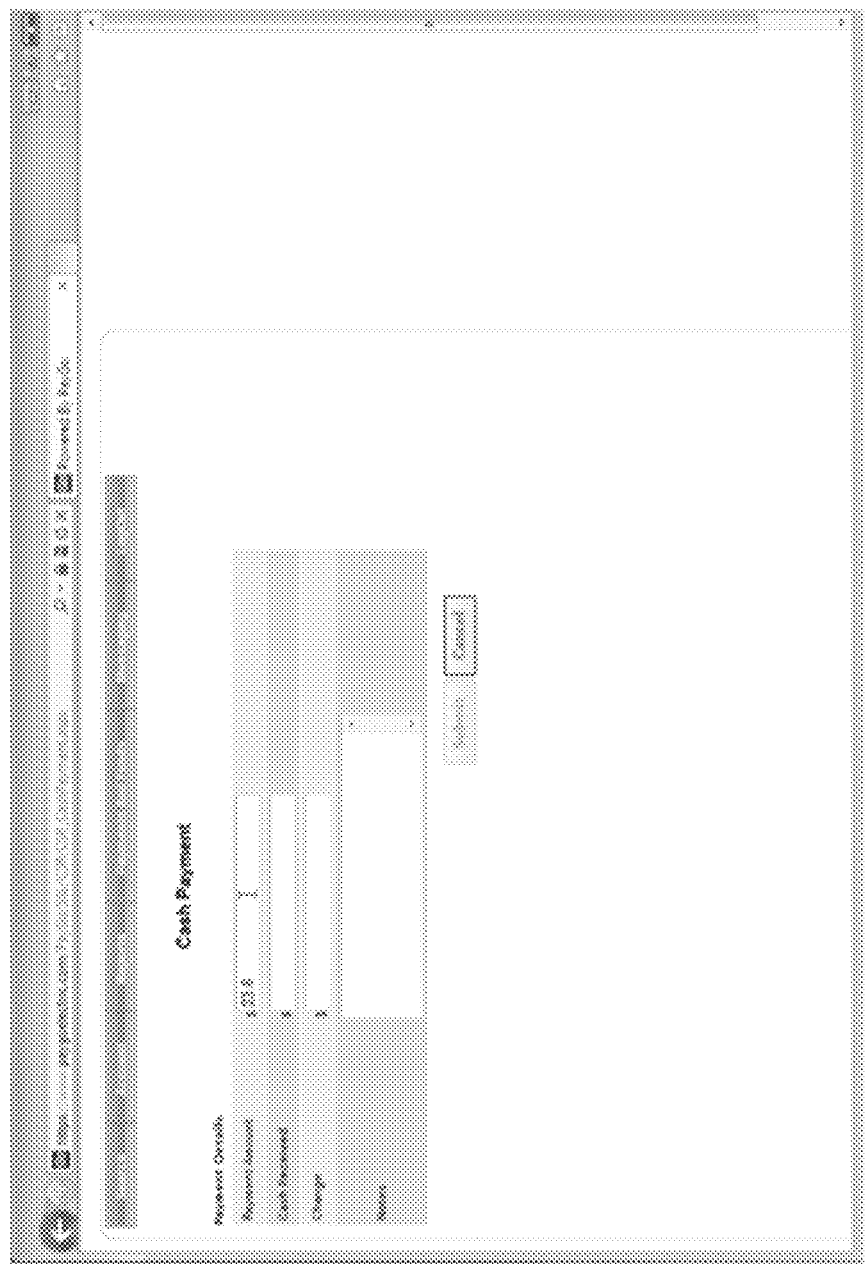
Figure 8:
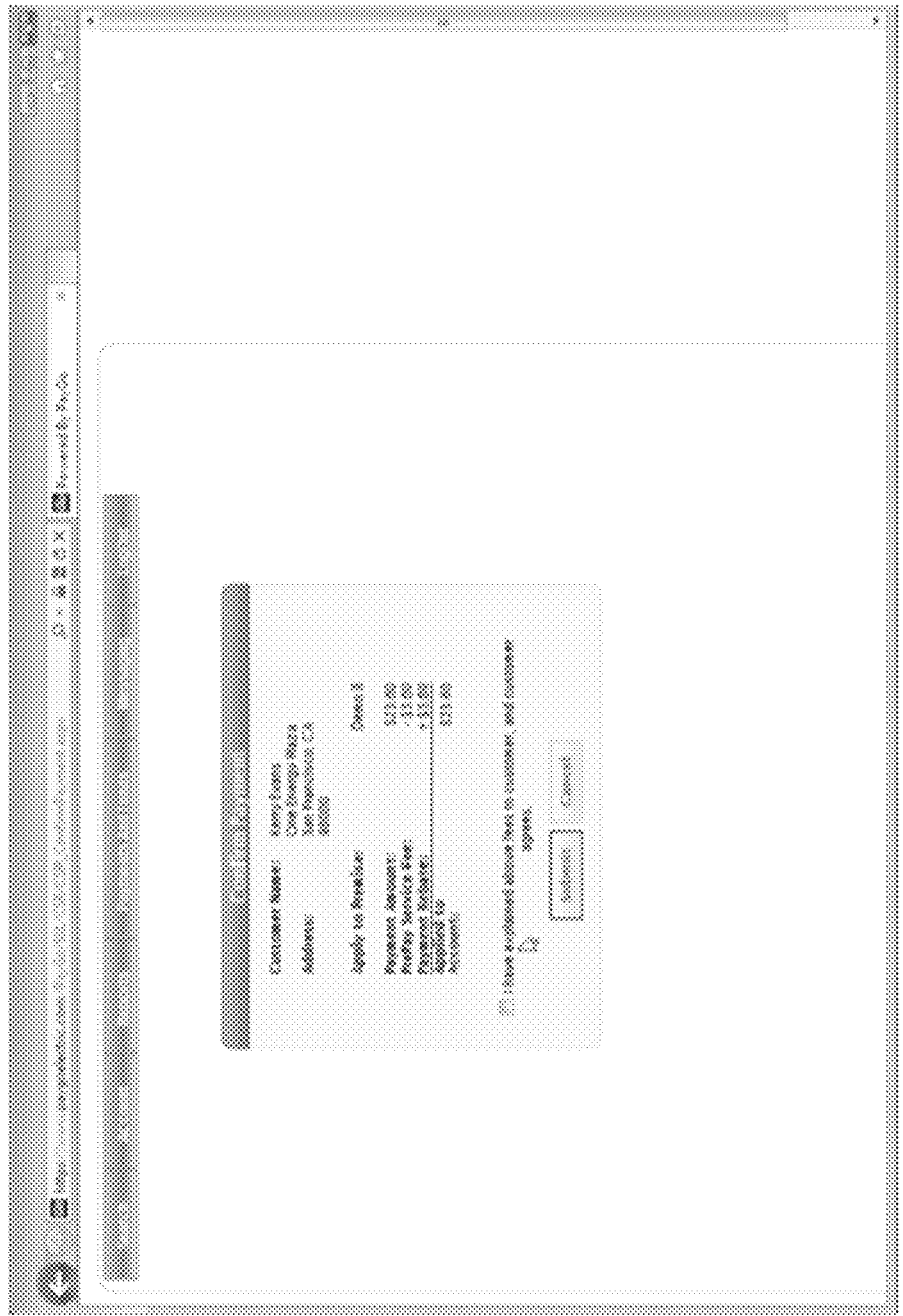

As shown in FIG. 7, the user can also be provided with a payment screen 700. In some embodiments, the payment screen can provide payment amount and method of payment means. In some embodiments, the user can pay via credit card, pre-paid card, gift card, PayPal, direct deposit, cash, or other suitable means. In some embodiments, as shown in FIG. 8, the customer may be assessed additional fees, such as a pre-paid service fee, disconnection fee, reconnection fee, CSR fees, or other fee associated with processing and maintaining the account. In a preferred embodiment, the user must accept these fees before continuing.

Figure 9:
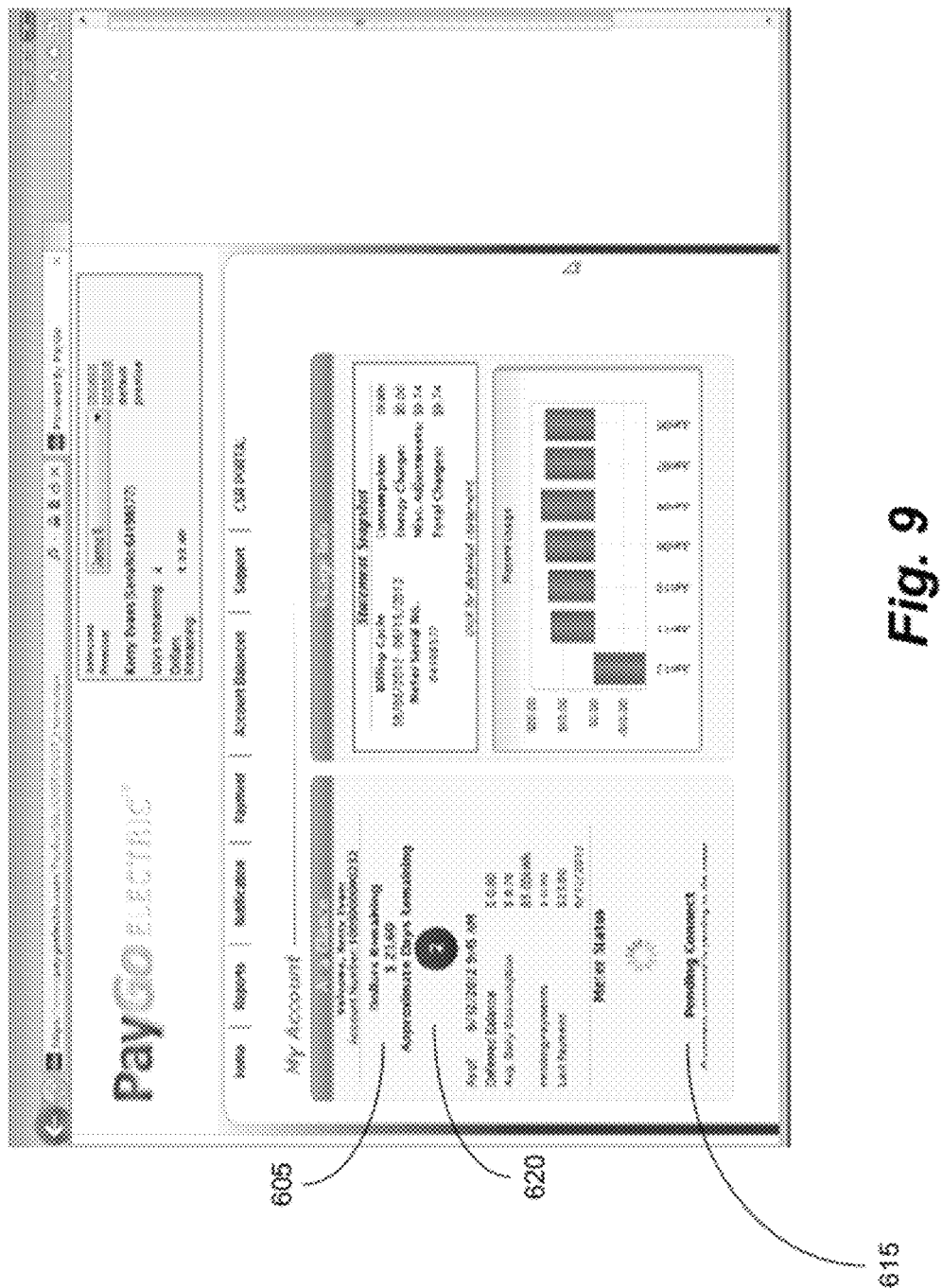

As shown in FIG. 9, upon payment, the user's account balance 605 and remaining days of connection 620 can be updated. In addition, the user's account status 615 can be updated to pending connect. In some embodiments, pending connect can indicate that the user's status is being changed from disconnected to soft armed and the signal has been sent to the meter, but has not yet been acknowledged.

Figure 10:
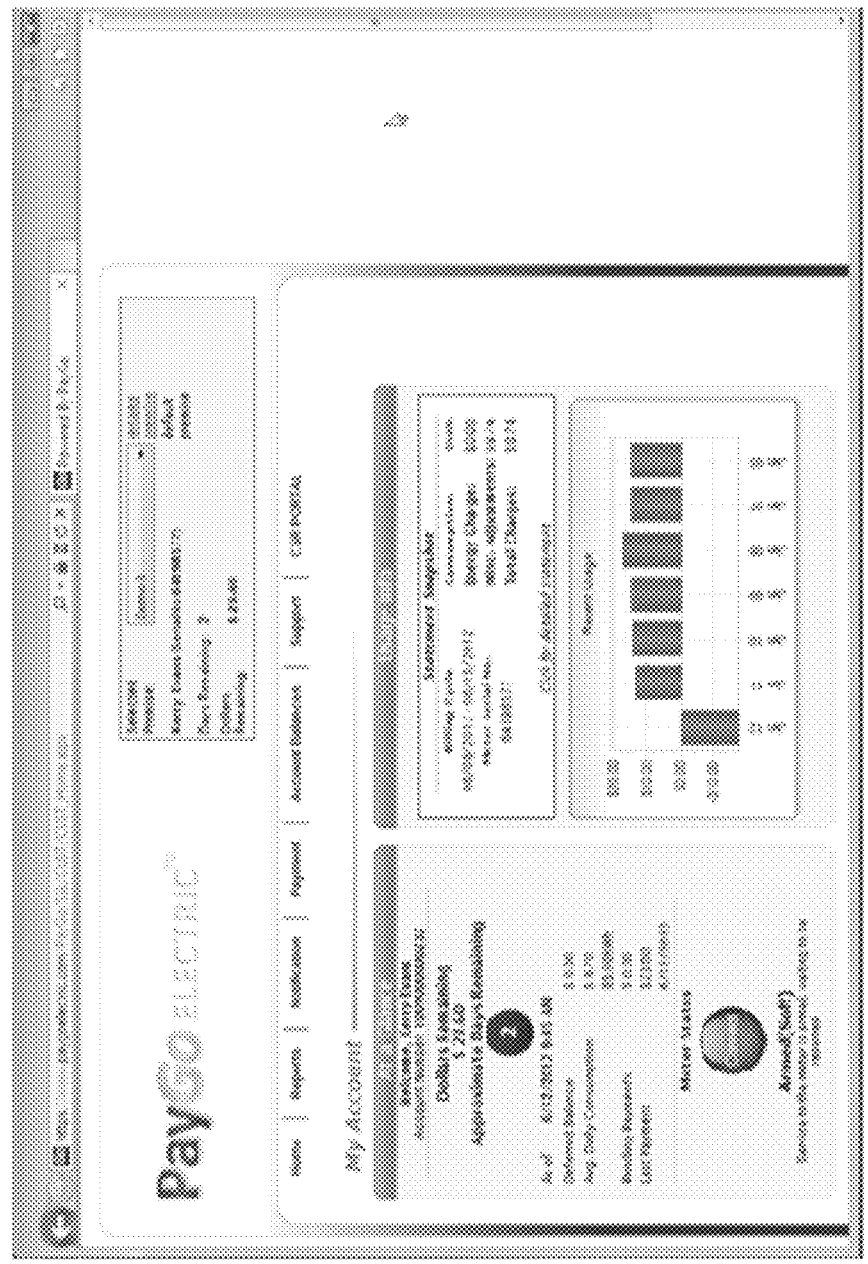
Figure 11:
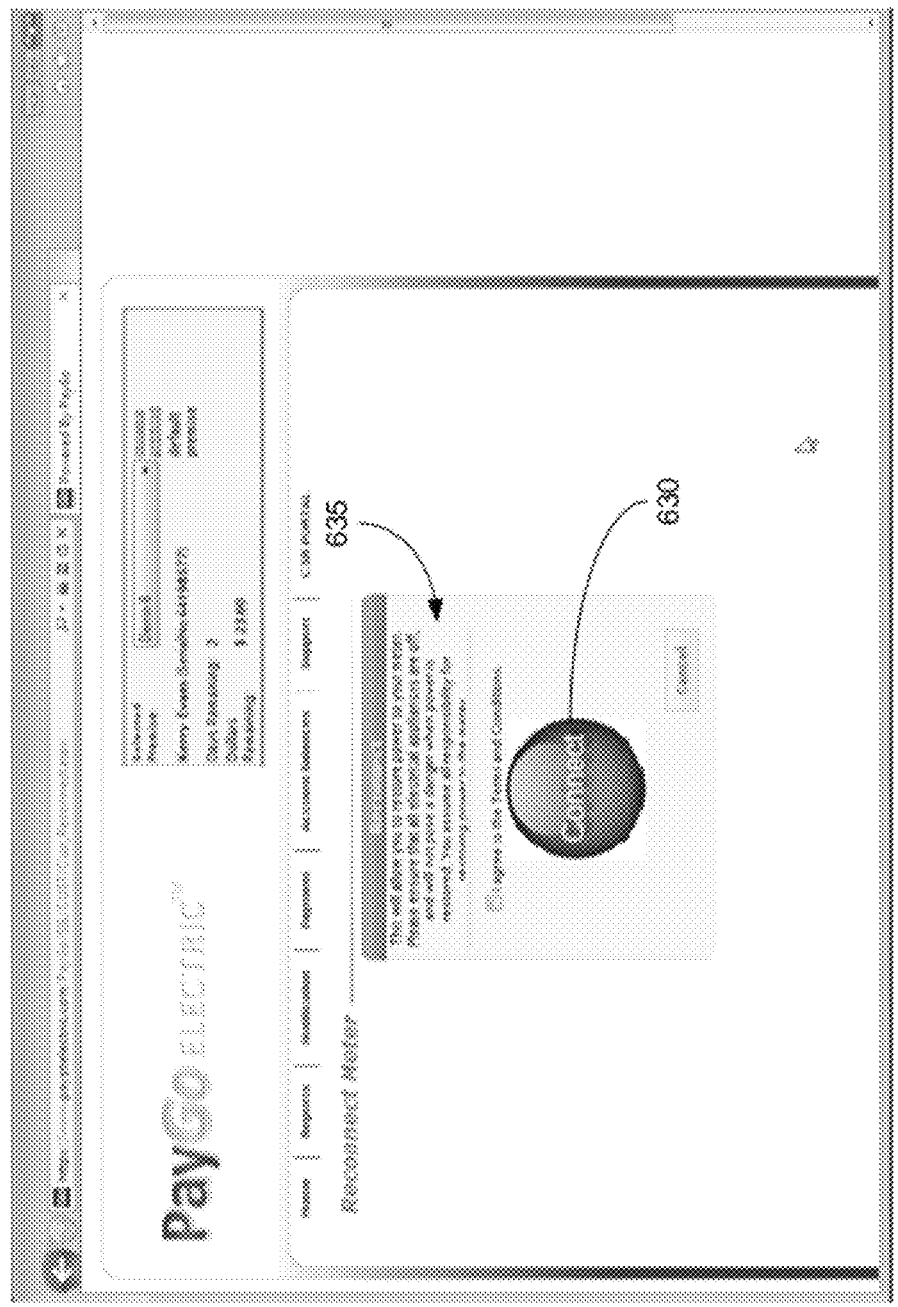

In some embodiments, as shown in FIG. 10, the meter can acknowledged the status update and the system can soft arm the meter and updated the user's status to soft armed 615. In this mode, the utility has not yet been reconnected, but the meter has been placed in "all but confirmation" mode. In other words, all that is required is for the use to acknowledge reconnection.

Figure 12:
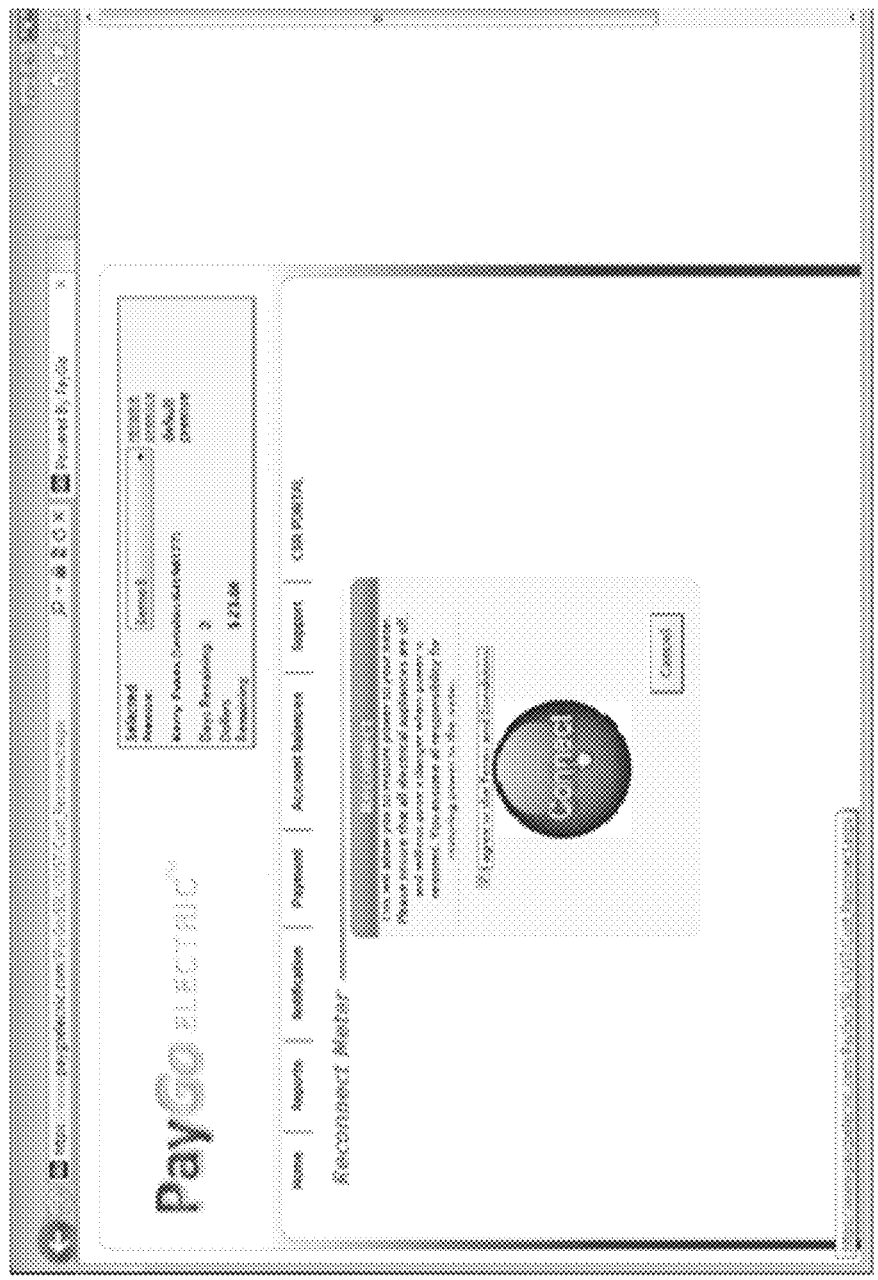
Figure 13:
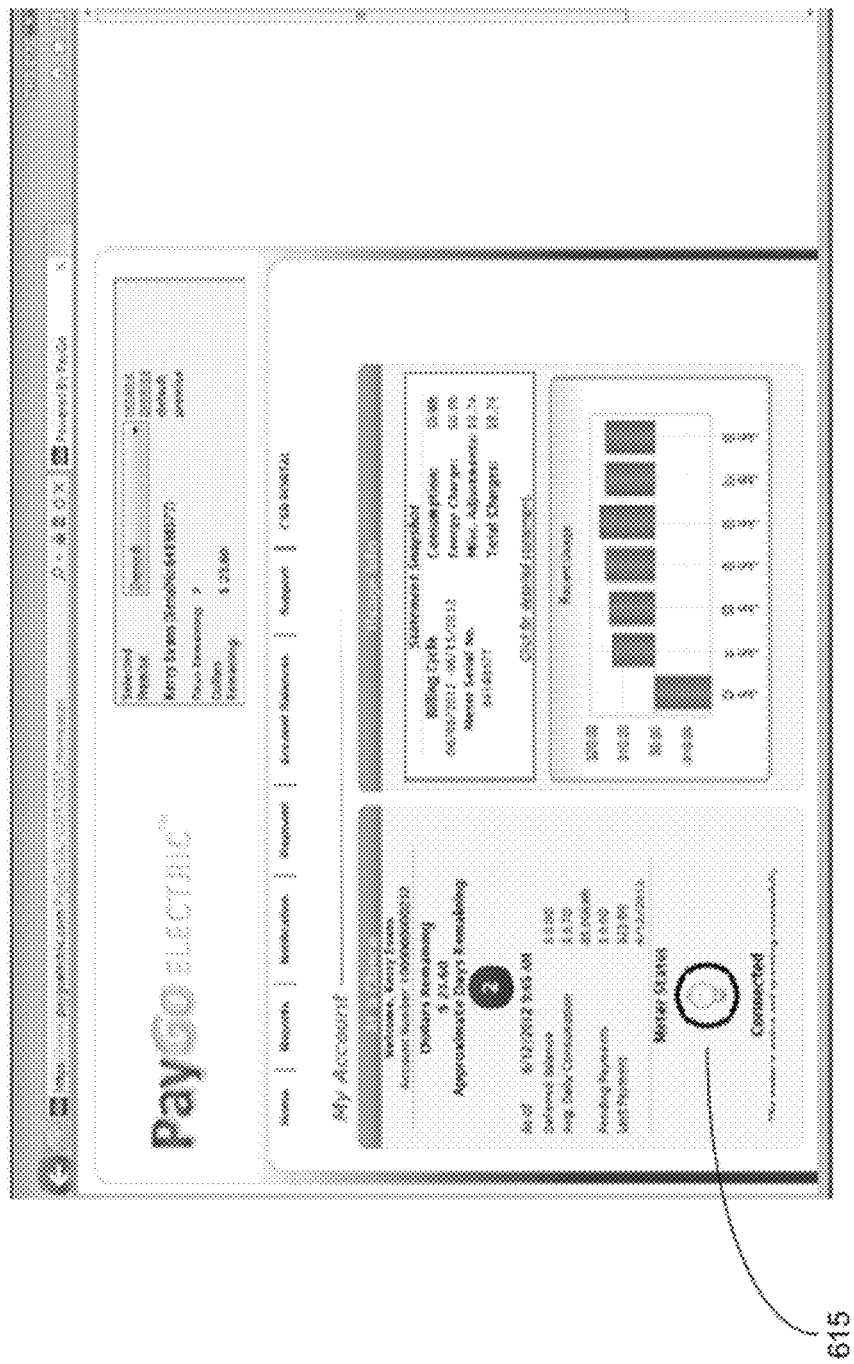
Figure 14:
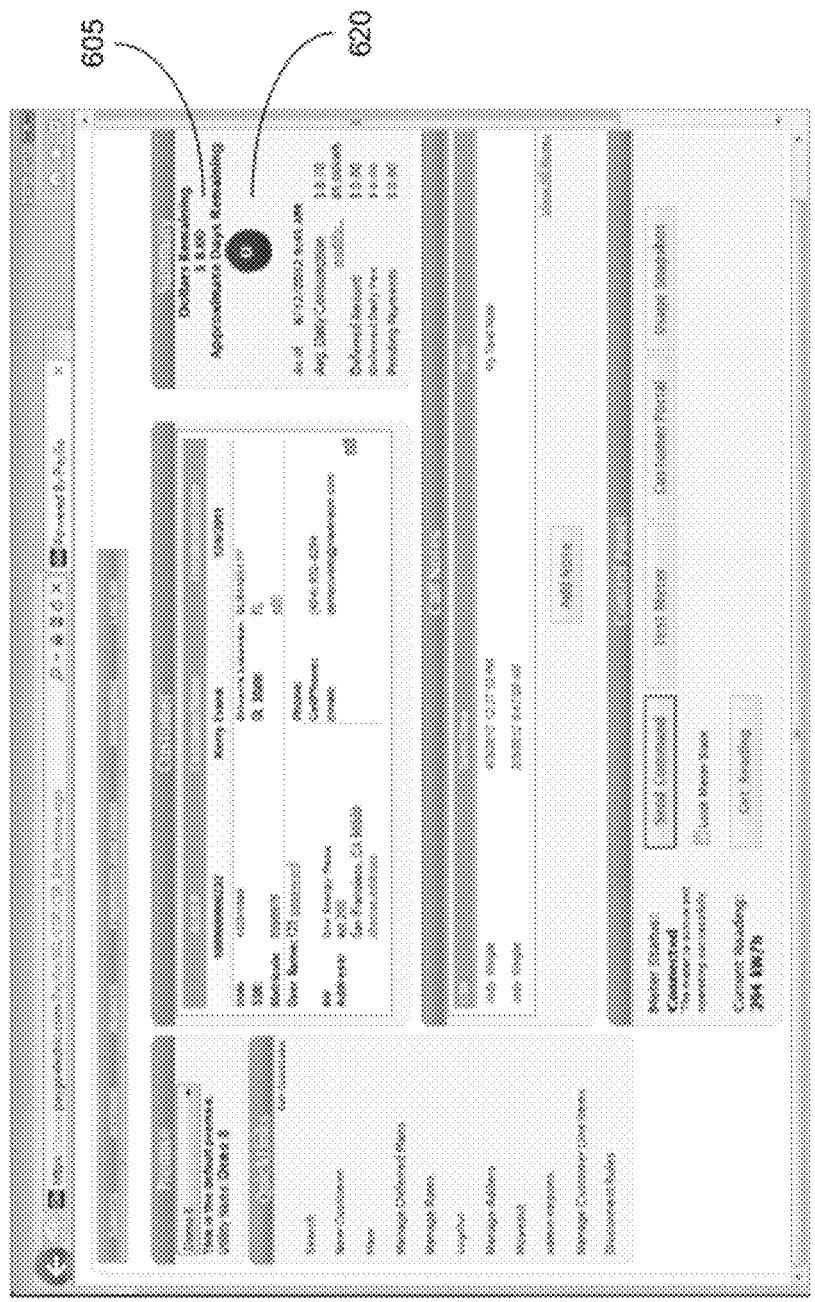
Figure 15:
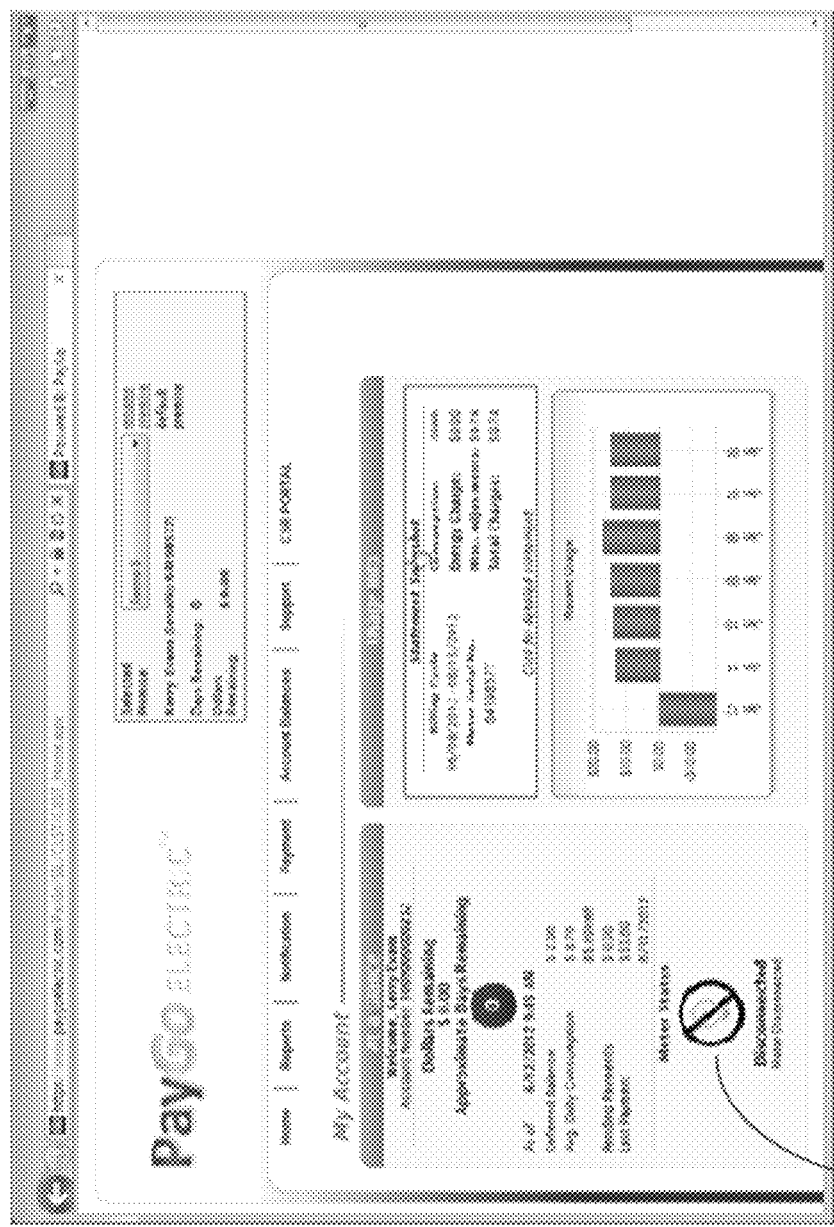

In a preferred embodiment, upon pressing the connect key (in whatever form), the system can provide the user with a terms and conditions screen 630. The screen can include terms and conditions 635, as desired by the utility, that must be acknowledged by the user to reconnect. The terms and conditions 635 can include, for example, various acknowledgements by the user that conditions are safe to restore the utility. The terms and conditions 635 can also disclose various fees including, but not limited to, disconnection/reconnection fees, cost per unit of service, and service and handling fees. The terms and conditions 635 can also include various legal and safety disclaimers and/or require the user to acknowledge that conditions are safe to restore the connection. In a preferred embodiment, as shown in FIG. 12, only after the user has accepted the terms and conditions 635 does the connect button become available.

After accepting the terms of use and pressing the payment button, the system can send the arm signal to the meter and update the user's status to connected. After connecting, the system can update the account balance 605 and the remaining number of days of connection 620 as the user consumes the utility. This can be done, for example, is real-time, hourly, daily, or at whatever interval is practical. This can enable the user to both manage their consumption, as much as possible, and plan for future payments (e.g., payment dates and amounts).

Figure 16:
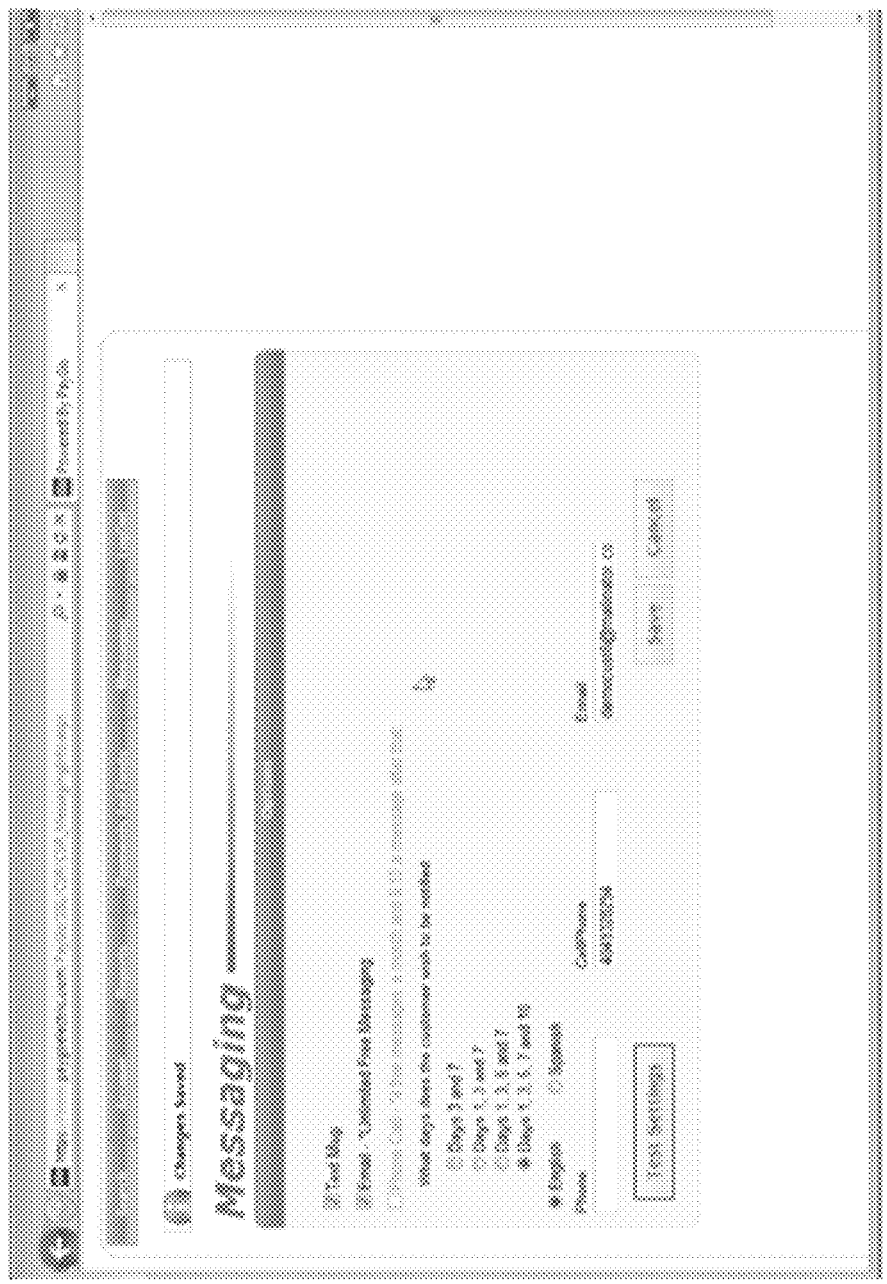

Of course, if the user does not pay on their account before the balance reaches some pre-determined amount (e.g., zero), the system can simply disconnect service until payment is made. As shown in FIG. 16, the user's account balance 605 and days of connection 620 are zero and the user's status 615 has been updated to disconnected.

In some embodiments, to avoid disconnection, the user can opt for reminder messages. The user can choose to receive, for example and not limitation, text messages, emails, or automated phone calls. The user can also choose a threshold for receiving messages. In some embodiments, for example, the user may wish to be reminded when they have a certain number of days remaining on their account or when their account reaches a certain minimum balance. In this manner, the user can replenish their account and avoid unwanted connection and/or service fees, for example.

As described above, therefore, embodiments of the present invention can reduce the potential liability faced by utility systems as the result of conventional (re)connection schemes. Conventional systems that require customers to physically depress buttons on the utility meter, for example, can expose customers to potential danger. In inclement weather, for example, the location of utility meters may require customers to navigate slippery areas, ice, or mud, or risk working with metallic equipment when lightning may be present, for example. Additionally, utility meters may be placed in locations that are inconvenient and/or unsafe for customers to access, even under normal weather conditions. Utility meters may be placed in bushes, for example, that can expose customers to dangerous or bothersome animals and/or insects (e.g., bees and wasps).

In other situations, such as in multi-family housing structures or apartments, the customers may not have physical access to the utility meters. In many cases, the meters are locked in a utility room, cabinet, or service facility (e.g., the apartment office) to which customers do not have access. In addition, requiring the customer to be present for connection may simply be inconvenient, as the customer may have to be home during normal business hours, for example, forcing them to take time from work, and possibly vacation or sick leave. Embodiments of the present invention reduce the risk and inconvenience in each of these scenarios by eliminating the need for customers to physically interact with the utility meter to affect connection.

Because the restoration of service relies on a command sent across a network, the system can be used with all types of utility meters, including those with and without conventional arm button functionality. The system can also be used for non-metered utilities such as cable TV and internet services. The soft arming metering system 200 replaces all arming functionality for all types of meters, and enables an efficient and secure connection of utility service meters. The system also provides complete customer control over when they want their service restored. In other words, customers may wish to pay their bill to remain current and/or avoid late fees, but may want to delay reconnection because they are out of town, for example.

Embodiments of the present invention can also save time and money for utilities with pre-pay or pay-as-you-go customers. Pre-pay systems are inherently designed, for example, to facilitate more frequent service connection and disconnection than other types of payment systems. Under conventional systems, therefore, each time a customer chooses to have service reconnected, a CSR must be involved to handle the request, and the customer must be present to arm the switch on the meter. Handling a large volume of these customers requires excessive CSR time, requiring additional personnel to maintain customer service. Embodiments of the present invention provide an automated approach to restoring service that saves time and expense by removing the CSR from the process, while still shifting liability to the customer.

While several possible embodiments are disclosed above, embodiments of the present invention are not so limited. For instance, while several possible connection schemes and components have been disclosed, other suitable communication methods, components, materials, and layouts could be selected without departing from the spirit of the invention. In addition, the location and configuration used for various features of embodiments of the present invention can be varied according to a particular application or service provider need that requires a slight variation due to, for example, the materials used and/or space or power constraints. Such changes are intended to be embraced within the scope of the invention.

The specific configurations, choice of materials, and the size and shape of various elements can be varied according to particular design specifications or constraints requiring a device, system, or method constructed according to the principles of the invention. Such changes are intended to be embraced within the scope of the invention. The presently disclosed embodiments, therefore, are considered in all respects to be illustrative and not restrictive. The scope of the invention is indicated by the appended claims, rather than the foregoing description, and all changes that come within the meaning and range of equivalents thereof are intended to be embraced therein.

What is claimed is:

1. A system for remotely connecting a utility service meter to a utility service, the system comprising:
   a controller for processing signals received from a remote utility server associated with the utility service and for controlling a disconnect switch;
   a communications module for connecting the controller with the remote utility server; and
   a disconnect switch in series connection with the utility service for connecting and disconnecting the utility service meter at a location associated with a utility service user account,
   wherein the system is incorporated into the utility service meter; and
   wherein, responsive to receipt of a first signal from the remote utility server to disconnect the utility from the location, the controller activates the disconnect switch; and
   wherein, responsive to receipt of a second signal from the remote utility server to connect the utility to the location, the second signal transmitted in response to receipt of an authorization transmission from the customer that (i) is responsive to a request sent to the electronic device of the customer from the remote utility server for the authorization transmission and (ii) includes a confirmation that conditions at the location are safe for connecting the utility meter to the utility service, the controller deactivates the disconnect switch.

2. The system of claim 1, wherein the disconnect switch is electromechanical.

3. The system of claim 2, wherein the disconnect switch is a relay.

4. The system of claim 2, wherein the disconnect switch is a mechanical valve to stop the flow of a gas or liquid.

5. The system of claim 4, wherein the mechanical valve is a ball valve.

6. The system of claim 1, wherein the communications module comprises a cellular transceiver.

7. The system of claim 1, wherein the communications module comprises an RF transceiver.

8. A system for remotely connecting a utility provided to a customer by a utility service, the system comprising:
   a utility server associated with the utility service for maintaining and storing a customer account database;
   a customer utility connection included in a utility service meter at a location associated with a customer, the customer utility connection comprising:
      a communications module for communicating with the utility server;
      a disconnect switch in series connection with the utility service for connecting and disconnecting the customer utility connection to and from the location; and
      a controller for processing signals received from the utility server and for controlling the disconnect switch,
   wherein, responsive to receipt of a first signal, sent from the remote utility server, to disconnect the utility connection from the location, the controller activates the disconnect switch:
   wherein, responsive to receipt of an authorization transmission from an electronic device of the customer, the utility server transmits a second signal to connect the utility connection at the location, the authorization transmission (i) being responsive to a request sent to the electronic device of the customer, from the utility server, for the authorization transmission and (ii) including a confirmation that conditions at the location are safe for connecting the utility meter to the utility service; and
   wherein, responsive to receipt of the second signal, the controller deactivates the disconnect switch.

9. The system of claim 8, wherein the communications module comprises an RF transceiver.

10. The system of claim 8, wherein the communications module comprises a cellular transceiver.

11. The system of claim 8, wherein the utility server must receive an acknowledgement signal from a user to send the second signal.

12. A method for remotely connecting a utility meter associated with a customer property to a utility service, the method comprising:
   receiving at a utility server associated with the utility service, and from an electronic device of the customer, an indication of pre-payment for the utility service, the utility server configured for maintaining and storing a customer account database;
   receiving, at the utility server, a request from the electronic device of the customer for connection of the utility meter to the utility service;

updating, in the customer account database on the utility server, a customer account status record associated with the utility meter to reflect a soft-armed status;

responsive to updating the customer account status record, initiating an authorization sequence, the authorization sequence comprising:

sending, to the electronic device of the customer and from the utility server, a message requesting an authorization transmission that includes a confirmation that conditions at the property are safe for connecting the utility meter to the utility service; and responsive to receiving, at the utility server and from the electronic device of the customer, the authorization transmission, sending a command from the utility server, to a customer utility connection of the utility meter, a command to connect the utility meter to the utility service, wherein the customer utility connection comprises:

a communications module for communicating with the utility server;

a disconnect switch in series connection with the utility service for connecting and disconnecting the customer utility connection to and from the location; and a controller for processing signals received from the utility server and for controlling the disconnect switch.

13. The method of claim 12, wherein the authorization transmission comprises an acknowledgement of terms and conditions from the customer.

14. The method of claim 12, wherein the authorization transmission is a text message.

15. The method of claim 12, wherein soft arming the utility meter comprises updating the status of the utility meter to indicate that the utility meter is ready for connection to the utility service.

16. The method of claim 12, further comprising:
receiving an agreement to the terms of service from the customer.

17. The method of claim 12, wherein the authorization sequence further comprises:

sending, to the customer and from the server, a notification that the utility meter associated with the customer account status record, has been soft armed.

18. The method of claim 12, wherein the authorization transmission further includes a confirmation that the user is present at the property.

19. A method for remotely connecting a utility meter to a utility service, the method comprising:

receiving a request, from an electronic device of a customer, at a utility server associated with the utility service to connect the utility meter to the utility service, the utility server configured for maintaining and storing a customer account balance in a customer account database;

updating, in the customer account database a customer account status record associated with the utility meter to reflect a soft-armed status:

responsive to updating the customer account status record, initiating an authorization sequence, the authorization sequence comprising:

sending, to the electronic device of the customer and from the utility server, a message requesting an authorization transmission, the message including a confirmation that conditions at a property associated with the utility meter are safe for connecting the utility meter to the utility service; and responsive to receiving, at the utility server and from the electronic device of the customer, the authorization transmission, sending a command from the utility server to a customer utility connection of the utility meter to connect the utility meter to the utility service, wherein the customer utility connection comprises:

a communications module for communicating with the utility server:

a disconnect switch in series connection with the utility service for connecting and disconnecting the customer utility connection to and from the location; and a controller for processing signals received from the utility server and control the disconnect switch.

\* \* \* \* \*